United States Patent
Meeran et al.

(10) Patent No.: US 11,669,423 B2
(45) Date of Patent: Jun. 6, 2023

(54) SYSTEMS AND METHODS FOR MONITORING APPLICATION HEALTH IN A DISTRIBUTED ARCHITECTURE

(71) Applicant: THE TORONTO-DOMINION BANK, Toronto (CA)

(72) Inventors: Ahamed P S Meeran, Mississauga (CA); Somak Bhattacharya, Mississauga (CA)

(73) Assignee: THE TORONTO-DOMINION BANK, Toronto (CA)

(*) Notice: Subject to any disclaimer, the term of this patent is extended or adjusted under 35 U.S.C. 154(b) by 34 days.

(21) Appl. No.: 16/925,862

(22) Filed: Jul. 10, 2020

(65) Prior Publication Data

US 2022/0012143 A1    Jan. 13, 2022

(51) Int. Cl.
| G06F 11/00 | (2006.01) |
| G06F 11/30 | (2006.01) |
| G06F 11/32 | (2006.01) |
| G06F 11/07 | (2006.01) |

(52) U.S. Cl.
CPC ........ *G06F 11/3006* (2013.01); *G06F 11/079* (2013.01); *G06F 11/0772* (2013.01); *G06F 11/323* (2013.01); *G06F 11/327* (2013.01)

(58) Field of Classification Search
None
See application file for complete search history.

(56) References Cited

U.S. PATENT DOCUMENTS

| 6,353,902 B1* | 3/2002 | Kulatunge ............ H04L 41/149 |
| | | 714/48 |
| 6,418,445 B1* | 7/2002 | Moerbeek ........... G06F 11/3006 |
| 7,523,357 B2 | 4/2009 | Irby et al. |
| 8,732,530 B2 | 5/2014 | Ng |
| 9,104,565 B2 | 8/2015 | Son et al. |
| 9,529,662 B1 | 12/2016 | Wangkhem et al. |
| 10,338,986 B2 | 7/2019 | Grealish et al. |
| 10,747,544 B1* | 8/2020 | Balasubramanian ....... |
| | | G06F 11/3055 |

(Continued)

OTHER PUBLICATIONS

Google Scholar/Patents—text refined (Year: 2021).*

(Continued)

*Primary Examiner* — Christopher S McCarthy

(57) ABSTRACT

A computing device configured for monitoring and analyzing health of a distributed computer system having a plurality of interconnected system components. The computing device tracks communication between the system components and monitors for an alert indicating an error in the communication in the distributed computer system. In response to the error, the computing device receives a health log from each of the system components defining an aggregate health log being in a standardized format indicating messages communicated between the system components. The computing device further receives network infrastructure information defining relationships between the system components and characterizing dependency information; and, automatically determines, based on the aggregate health log and the network infrastructure information, a particular component originating the error and associated dependent components from the system components affected.

15 Claims, 7 Drawing Sheets

(56) References Cited

U.S. PATENT DOCUMENTS

| | | | | |
|---|---|---|---|---|
| 2002/0021788 A1* | 2/2002 | Kasvand | .............. | H04Q 3/0075 |
| | | | | 379/32.02 |
| 2005/0114502 A1* | 5/2005 | Raden | .................... | G06F 11/328 |
| | | | | 709/224 |
| 2008/0016115 A1* | 1/2008 | Bahl | ....................... | H04L 41/22 |
| 2014/0122930 A1 | 5/2014 | Devale et al. | | |
| 2016/0292028 A1* | 10/2016 | Gamage | ................ | G06F 11/076 |
| 2016/0364283 A1* | 12/2016 | Baron | ................. | G06F 11/0751 |
| 2018/0034685 A1* | 2/2018 | Naous | ..................... | H04L 41/22 |
| 2018/0113773 A1* | 4/2018 | Krishnan | .............. | G06F 11/079 |
| 2019/0258535 A1* | 8/2019 | Morisse | ................ | G06F 11/079 |
| 2020/0042426 A1* | 2/2020 | Ambichl | ............. | G06F 11/3495 |

OTHER PUBLICATIONS

Google Scholar/Patents—text refined (Year: 2022).*
Google Scholar/Patents search—text refined (Year: 2022).*
Google Scholar/Patents search—text refined (Year: 2023).*
Claire Le Goues, Michael Pradel, and Abhik Roychowdhury. "Automated Program Repair". Communication ACM, Dec. 2019, pp. 57-65.

* cited by examiner

SYSTEMS AND METHODS FOR MONITORING APPLICATION HEALTH IN A DISTRIBUTED ARCHITECTURE

FIELD

The present disclosure generally relates to monitoring application health of interconnected application system components within a distributed architecture system. More particularly, the disclosure relates to a holistic system for automatically identifying a root source of one or more errors in the distributed architecture system for subsequent analysis.

BACKGROUND

In a highly distributed architecture, current error monitoring systems utilize monitoring rules to track only an individual component in the architecture (typically the output component interfacing with external components) and raise an alert based on the individual component being tracked indicating an error. Thus, the monitoring rules can trigger the alert based on the individual component's error log, but do not take into account the whole distributed architecture system and rather rely on developers to manually troubleshoot and determine where the error may have actually occurred in a fragmented and error prone manner. That is, current monitoring techniques involve error analysis which is performed haphazardly using trial and error as well as being heavily human centric. This provides an unpredictable and fragmented analysis while utilizing extensive manual time and cost to possibly determine a root cause which may not be accurate.

Thus, when there is an error at one of the system components, the analysis requires the support team to manually determine whether the error may have originated in the component which alerted the error or elsewhere in the system which may lead to uncertainties and being unfeasible due to the complexities of the distributed architecture.

In prior monitoring systems of distributed architectures, when an error occurs within the system, a system component (e.g. an API) directly associated with the user interface reporting the error may first be investigated and then a manual and resource intensive approach is performed to examine each and every system component to determine where the error would have originated.

Accordingly, there is a need to provide a method and system to facilitate automated and dynamic application health monitoring in distributed architecture systems with a view to the entire system, such as to obviate or mitigate at least some or all of the above presented disadvantages.

SUMMARY

It is an object of the disclosure to provide a computing device for improved holistic health monitoring of system components (e.g. API software components) in a multi-component system of a distributed architecture to determine a root cause of errors (e.g. operational issues or software defects). In some aspects, this includes proactively spotting error patterns in the distributed architecture and notifying parties.

The proposed disclosure provides, in at least some aspects, a standardized mechanism of automatically determining one or more system components (e.g. an API) originating the error in the distributed architecture.

There is provided a computing device for monitoring and analyzing health of a distributed computer system having a plurality of interconnected system components, the computing device having a processor coupled to a memory, the memory storing instructions which when executed by the processor configure the computing device to: track communication between the system components and monitor for an alert indicating an error in the communication in the distributed computer system, upon detecting the error: receive a health log from each of the system components together defining an aggregate health log, each health log being in a standardized format indicating messages communicated between the system components; receive, from a data store, network infrastructure information defining one or more relationships for connectivity and communication flow between the system components, the relationships characterizing dependency information between the system components; and, automatically determine, based on the aggregate health log and the network infrastructure information, a particular component of the system components originating the error and associated dependent components from the system components affected. The standardized format may comprise a JSON format.

Each health log may further comprise a common identifier for tracing a route of the messages communicated for a transaction having the error.

The computing device may further be configured to obtain health monitoring rules comprising data integrity information for pre-defined communications between the system components from the data store, the health monitoring rules for verifying whether each of the health logs complies with the data integrity information.

The health monitoring rules may further defined based on historical error patterns for the distributed computer system associating a set of traffic flows for the messages between the system components and potentially occurring in each of the health logs to a corresponding error type.

The computing device may further be configured to: determine from the dependency information indicating which of the system components are dependent on one another for operations performed in the distributed computer system, an impact of the error originated by the particular component on the associated dependent components.

The computing device may further be configured to, upon detecting the alert, for: displaying the alert on a user interface of a client application for the device, the alert based on the particular component originating the error determined from the aggregate health log.

The computing device may further be configured for displaying on the user interface along with the alert, the associated dependent components to the particular component.

The system components may be APIs (application programming interfaces) on one or more connected computing devices and the health log may be an API log for logging activity for the respective API in communication with other APIs and related to the error.

The processor may further configure the computing device to automatically determine origination of the error by: comparing each of the health logs in the aggregate health log to the other health logs in response to the relationships in the network infrastructure information.

There is provided a computer implemented method for monitoring and analyzing health of a distributed computer system having a plurality of interconnected system components, the method comprising: tracking communication between the system components and monitor for an alert indicating an error in the communication in the distributed computer system, upon detecting the error: receiving a health log from each of the system components together defining an aggregate health log, each health log being in a standardized format indicating messages communicated between the system components; receiving, from a data store, network infrastructure information defining one or more relationships for connectivity and communication flow between the system components, the relationships characterizing dependency information between the system components; and, automatically determining, based on the aggregate health log and the network infrastructure information, a particular component of the system components originating the error and associated dependent components from the system components affected.

There is provided a computer readable medium comprising a non-transitory device storing instructions and data, which when executed by a processor of a computing device, the processor coupled to a memory, configure the computing device to: track communication between system components of a distributed computer system having a plurality of interconnected system components and monitor for an alert indicating an error in the communication in the distributed computer system, upon detecting the error: receive a health log from each of the system components together defining an aggregate health log, each health log being in a standardized format indicating messages communicated between the system components; receive, from a data store, network infrastructure information defining one or more relationships for connectivity and communication flow between the system components, the relationships characterizing dependency information between the system components; and, automatically determine, based on the aggregate health log and the network infrastructure information, a particular component of the system components originating the error and associated dependent components from the system components affected.

There is provided a computer program product comprising a non-transient storage device storing instructions that when executed by at least one processor of a computing device, configure the computing device to perform in accordance with the methods herein.

BRIEF DESCRIPTION OF THE DRAWINGS

These and other features of the disclosure will become more apparent from the following description in which reference is made to the appended drawings wherein.

DETAILED DESCRIPTION

Figure 1:
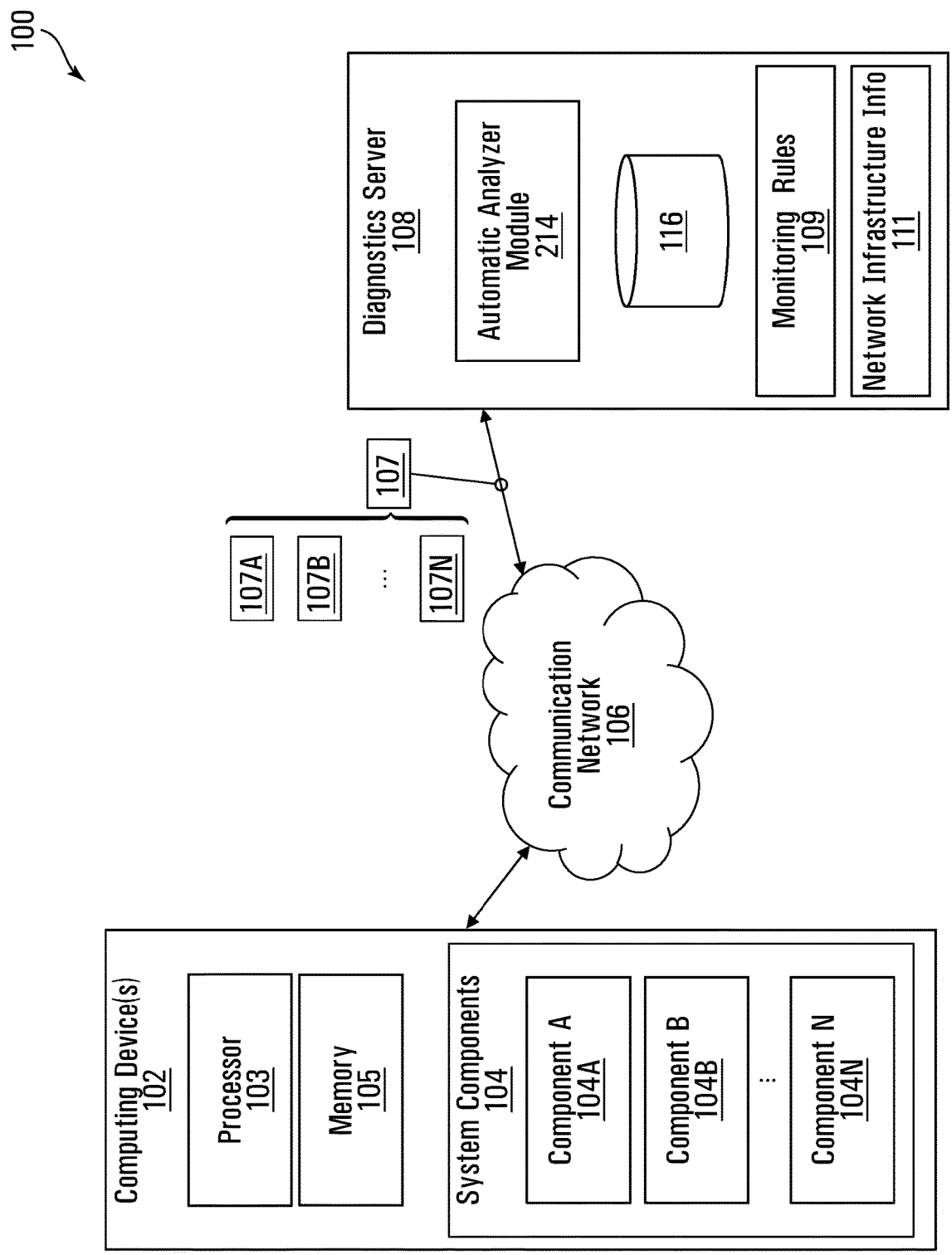
FIG. 1 is a schematic block diagram of a computing system environment for providing automated application health monitoring and error origination analysis in accordance with one or more aspects of the present disclosure.

FIG. 1 is a diagram illustrating an example computer network 100 in which a diagnostics server 108, is configured for providing unified deep diagnostics of distributed system components and particularly, error characterization analysis for the distributed components of one or more computing device(s) 102 communicating across a communication network 106. The diagnostics server 108 is configured to receive an aggregate health log including communication health logs 107 (individually 107A, 107B . . . 107N) from each of the system components, collectively shown as system components 104 (individually shown as system components 104A-104N) such as API components in a standard format. The communication health logs 107 may be linked for example via a common key tracing identifier that may show that a particular transaction involved components A, B, and C and the types of events or messages communicated for the transaction, by way of example. In one example, the common identifier comprises key metadata that interconnects via an entity function role. In one case, if the messages communicated between components 104A-104N are financial transactions then the common tracing identifier may link parties affecting a particular financial transaction. The common tracing identifier (e.g. traceability ID 506 in FIG. 5) may further be modified each time it is processed or otherwise passes through one of the components 104 to also facilitate identifying a path taken by a message when communicated between the components 104 during performing a particular function (e.g. effecting a transaction).

The computing device(s) 102 each comprise at least a processor 103, a memory 105 (e.g. a storage device, etc.) and one or more distributed system components 104. The memory 105 storing instructions which when executed by the computing device(s) 102 configure the computing device(s) 102 to perform operations described herein. The distributed system components 104 may be configured (e.g. via the instructions stored in the memory 105) to provide the distributed architecture system described herein for collaborating together to provide a common goal such as access to resources on the computing devices 102; or access to communication services provided by the computing device 102; or performing one or more tasks in a distributed manner such that the computing nodes work together to provide the desired task functionality. The distributed system components 104 may comprise distributed applications such as application programming interfaces (APIs), user interfaces, etc.

In some aspects, such a distributed architecture system provided by the computing device(s) 102 includes the components 104 being provided on different platforms (e.g. correspondingly different machines such that there are at least two computing devices 102 each containing some of the components 104) so that a plurality of the components (e.g. 104A . . . 104N) can cooperate with one another over the communication network 106 in order to achieve a specific objective or goal (e.g. completing a transaction or performing a financial trade). For example the computing device(s) 102 may be one or more distributed servers for various functionalities such as provided in a trading platform. Another example of the distributed system provided by computing device(s) 102 may be a client/server model. In this aspect no single computer in the system carries the entire load on system resources but rather the collaborating computers (e.g. at least two computing devices 102) execute jobs in one or more remote locations.

In yet another aspect, the distributed architecture system provided by the computing device(s) 102 may be more generally, a collection of autonomous computing elements (e.g. which may be either hardware devices and/or a software processes such as system components 104) that appear to users as a single coherent system. Typically, the computing elements (e.g. either independent machines or independent software processes) collaborate together in such a way via a common communication network (e.g. network 106) to perform related tasks. Thus, the existence of multiple computing elements is transparent to the user in a distributed system.

Furthermore, as described herein, although a single computing device 102 is shown in FIG. 1 with distributed computing elements provided by system components 104A-104N which reside on the single computing device 102; alternatively, a plurality of computing devices 102 connected across the communication network 106 in the network 100 may be provided with the components 104 spread across the computing devices 102 to collaborate and perform the distributed functionality via multiple computing devices 102.

The communications network 106 is thus coupled for communication with a plurality of computing devices. It is understood that communication network 106 is simplified for illustrative purposes. Communication network 106 may comprise additional networks coupled to the WAN such as a wireless network and/or local area network (LAN) between the WAN and the computing devices 102 and/or diagnostics server 108.

The diagnostics server 108 further retrieves network infrastructure information 111 for the system components 104 (e.g. may be stored on the data store 116, or directly provided from the computing devices 102 hosting the system components 104). The network infrastructure information 111 may characterize various types of relationships between the system components and/or communication connectivity information for the system components. For example, this may include dependency relationships, such as operational dependencies or communication dependencies between the system components 104A-104N for determining the health of the system and tracing an error in the system to its source.

The operational dependencies may include for example, whether a system component 104 requires another component to call upon or otherwise involve in order to perform system functionalities (e.g. performing a financial transaction may require component A to call upon functionalities of components B and N). The communication dependencies may include information about which components 104 are able to communicate with and/or receive information from one another (e.g. have wired or wireless communication links connecting them).

Figure 2:
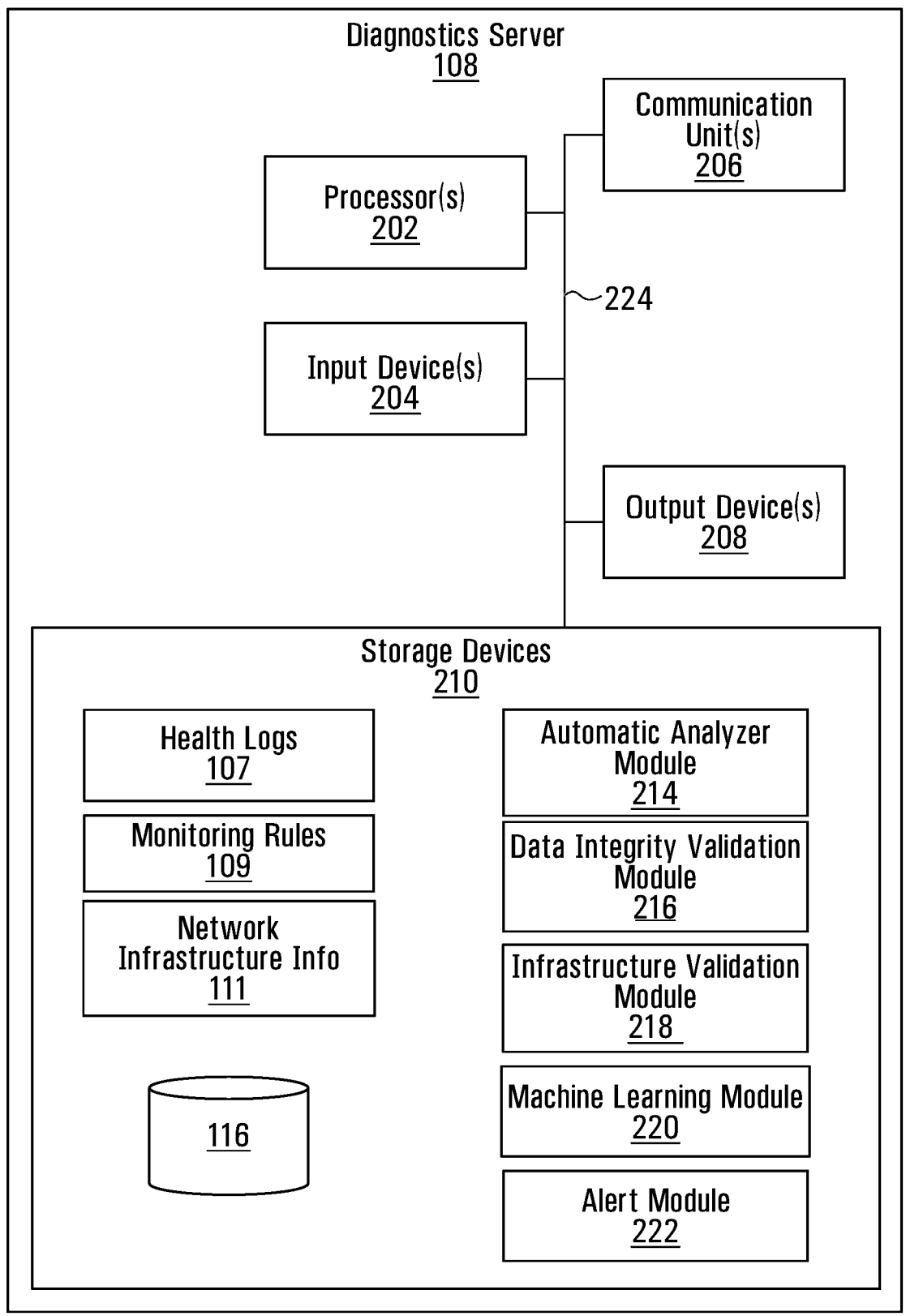
FIG. 2 is a schematic block diagram illustrating example components of a diagnostics server in FIG. 1, in accordance with one or more aspects of the present disclosure.

Additionally, the diagnostic server 108 comprises an automatic analyzer module 214 communicating with the data store 116 as will be further described with respect to FIG. 2. The automatic analyzer module 214 receives aggregate health logs 107 for each of the components 104A . . . 104N associated with a particular task or job (e.g. accessing a resource provided by components 104) as well as network infrastructure information 111 and is then configured to determine a root cause of the error characterizing a particular system component (e.g. 104A) which originated an error in the system. The automatic analyzer module 214 may be triggered to detect the source of an error upon monitoring system behaviors and determining that an error has occurred in the network 100. Such a determination may be made by applying a set of monitoring rules 109 via the automatic analyzer module 214 which are based on historical error patterns for the system components 104 and associated traffic patterns thereby allowing deeper understanding of the error (e.g. API connection error) and the expected operational resolution. In one aspect, the monitoring rules 109 may be used by the automatic analyzer module 214 to map a historical error pattern (e.g. communications between components 104 following a specific traffic pattern as may be predicted by a machine learning module in FIG. 2) to a specific error type. Additionally, in at least one aspect, the health monitoring rules 109 may indicate data integrity metadata indicating a format and/or content of messages communicated between components 104. In this way, when the messages differ from the data integrity metadata, then the automatic analyzer module 214 may indicate (e.g. via a display on the diagnostics server 108 or computing device 102) that the error relates to data integrity deviations.

Additionally, in at least one aspect, the automatic analyzer module 214 may use the network infrastructure information 111 and the monitoring rules 109 (mapping error patterns to additional metadata characterizing the error) to identify the error, its root cause (e.g. via the relationship information in the network infrastructure information 111) and the dependency impact including other system components 104 affected by the error and having a relationship to the error originating system component.

Thus, in one or more aspects, the network 100 utilizes a holistic approach to health monitoring by providing an automatic analyzer 214 coupled to all of the system components 104 (e.g. APIs) via the network 106 for analyzing the health of the system components 104 as a whole and individually. Notably, when an error occurs in the system (e.g. an API fails to perform an expected function or timeout occurs), the error may be tracked and its origin located.

In at least one aspect, the health logs 107 are converted to and/or provided in a standardized format (e.g. JSON format) from each of the system components 104. The standardized format may further include a smart log pattern which can reveal functional dependencies between the system components 104, and key metadata which interconnects message for a particular task or job (e.g. customer identification). The diagnostics server 108 is thus configured to receive the health logs 107 in a standardized format as well as receiving information about the network infrastructure (e.g. relationships and dependencies between the system components) from a data store to determine whether a detected system error follows a specific system error pattern and therefore the dependency impact of the error on related system components 104.

FIG. 2 is a diagram illustrating in schematic form an example computing device (e.g. diagnostics server 108 of FIG. 1), in accordance with one or more aspects of the present disclosure. The diagnostics server 108 facilitates providing a system to perform health monitoring of distributed architecture components (e.g. APIs) as a whole using health logs (e.g. API logs) and network architecture information defining relationships for the distributed architecture components. The system may further capture key metadata (e.g. key identifiers such as digital identification number of a transaction across an institution among various distributed components) to track messages communicated between the components and facilitate determining the route taken by the message when an error was generated. Preferably, as described herein, the diagnostics server 108 is configured to utilize at least the health logs and the network architecture information to determine a root cause of an error generated in the overall system.

Diagnostics server 108 comprises one or more processors 202, one or more input devices 204, one or more communication units 206 and one or more output devices 208. Diagnostics server 108 also includes one or more storage devices 210 storing one or more modules such as automatic analyzer module 214; data integrity validation module; infrastructure validation module 218; machine learning module 220; alert module 222; a data store 116 for storing data comprising health logs 107; monitoring rules 109; and network infrastructure information 111.

Communication channels 224 may couple each of the components 116, 202, 204, 206, 208, 210, 214, 216 and 218 for inter-component communications, whether communicatively, physically and/or operatively. In some examples, communication channels 224 may include a system bus, a network connection, an inter-process communication data structure, or any other method for communicating data.

One or more processors 202 may implement functionality and/or execute instructions within diagnostics server 108. For example, processors 202 may be configured to receive instructions and/or data from storage devices 210 to execute the functionality of the modules shown in FIG. 2, among others (e.g. operating system, applications, etc.) Diagnostics server 108 may store data/information to storage devices 210 such as health logs 107; monitoring rules 109 and network infrastructure info 111. Some of the functionality is described further below.

One or more communication units 206 may communicate with external devices via one or more networks (e.g. communication network 106) by transmitting and/or receiving network signals on the one or more networks. The communication units may include various antennae and/or network interface cards, etc. for wireless and/or wired communications.

Input and output devices may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. 224).

The one or more storage devices 210 may store instructions and/or data for processing during operation of diagnostics server 108. The one or more storage devices may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Referring to FIGS. 1 and 2, automatic analyzer module 214 may comprise an application which monitors communications between system components 104 and monitors for an alert indicating an error in the communications. Upon indication of an alert, the automatic analyzer module 214 receives an input indicating a health log (e.g. 107A . . . 107N) from each of the system components 104 together defining an aggregate health log 107 and the network infrastructure information 111 defining relationships including interdependencies for connectivity and/or operation and/or communication between the system components. Based on this, the automatic analyzer module 214 automatically determines a particular component of the system components originating the error and associated dependent components from the system components affected. In one example, this may include the automatic analyzer module 214 using the standardized format of messages in the health logs 107 to capture key identifiers (e.g. connection identifiers, message identifiers, etc.) linking a particular task to the messages and depicting a route travelled by the messages and applying the network infrastructure information 111 to the health logs to reveal a source of the error and the dependency impact. In some aspects, the automatic analyzer module 214 further accesses a set of monitoring rules 109 which may associate specific types of messages or traffic flows indicated in the health logs with specific system error patterns and typical dependency impacts (e.g. for a particular type of error X, system components A, B, and C would be affected).

The machine learning module 220 may be configured to track communication flows between components 104, usage/error patterns of the components 104 over a past time period to the current time period and help predict the presence of an error and its characteristics. The machine learning module 220 may generate a mapping table between specific error patterns in the messages communicated between the components 104 and corresponding information characterizing the error including error type, possible dependencies and expected operational resolution. In this way, the machine learning module 220 may utilize machine learning models such as regression techniques or convolutional neural networks, etc. to proactively predict additional error patterns and associated details based on historical usage data. In at least some aspects, the machine learning module 220 cooperates with the automatic analyzer module 214 for proactively determining that an error exists and characterizing the error.

Data integrity validation module 216 may be configured to retrieve a set of predefined data integrity rules provided in the monitoring rules 109 to determine whether the data in the health logs 107 satisfies the data integrity rules (e.g. format and/or content of messages in the health logs 107).

Infrastructure validation module 218 may be configured to retrieve a set of predefined network infrastructure rules (e.g. for a particular task) based on information determined from the health logs 107 and determine whether the data in the network infrastructure info 111 satisfies the predefined rules 109.

Figure 6:
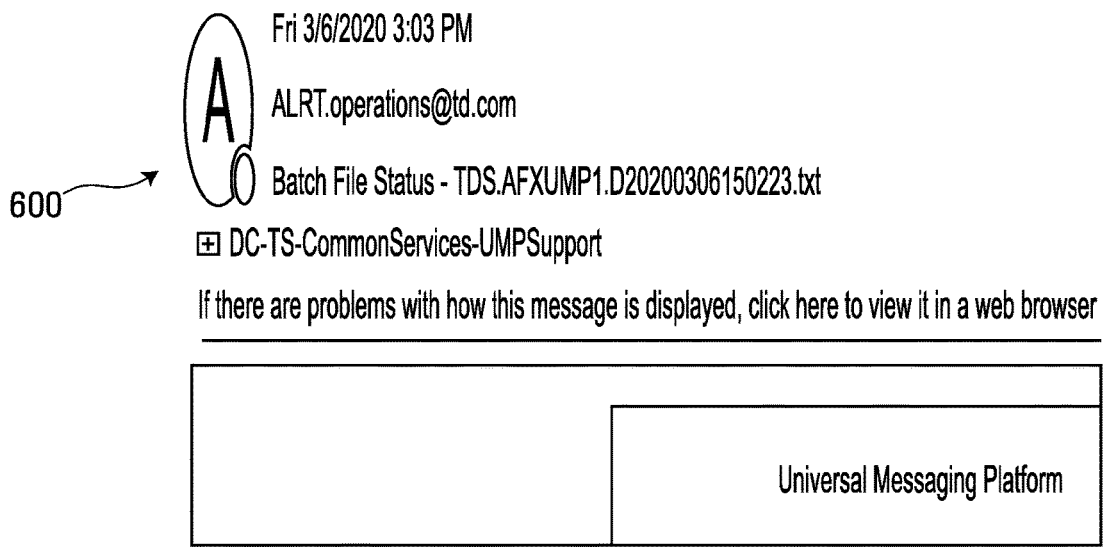
FIG. 6 is a diagram illustrating an example diagnostic results alert in accordance with one or more aspects of the present disclosure.

Alert module 222 may comprise a user interface either located on the server 108 or control of an external user interface (e.g. via the communication units 206) to display the error detected by the server 108 and characterizing information (e.g. the source of the error, dependency impacts, and possible operational solutions) to assist with the resolution of the error. An example of such an alert is shown in FIG. 6.

Referring again to FIG. 2, it is understood that operations may not fall exactly within the modules 214; 216; 218; 220; and 222 such that one module may assist with the functionality of another.

Figure 3:
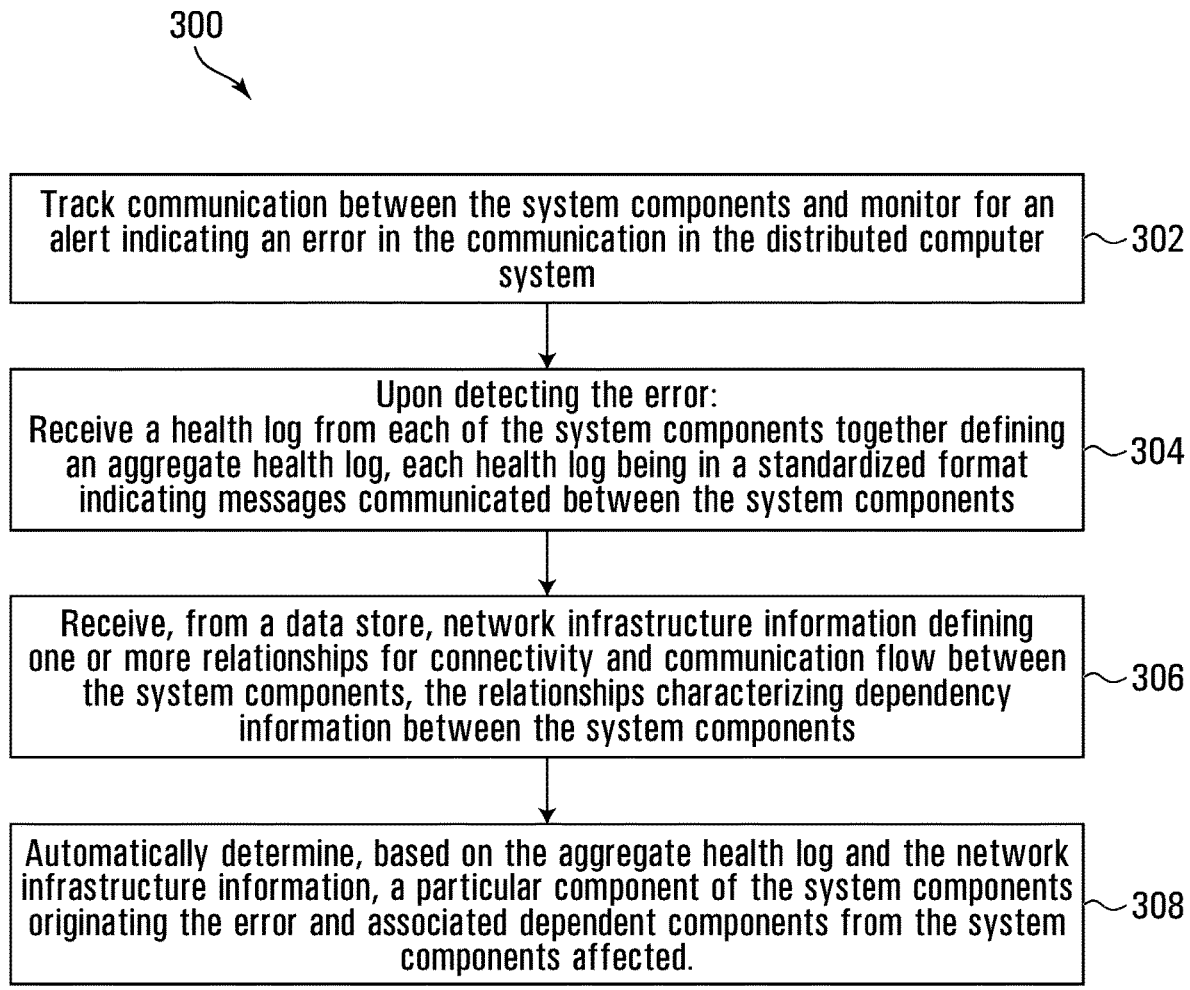
FIG. 3 is a flowchart illustrating example operations of the diagnostics server of FIG. 1, in accordance with one or more aspects of the present disclosure.

FIG. 3 is a flow chart of operations 300 which are performed by a computing device such diagnostics server 108 shown in FIGS. 1 and 2. The computing device may comprise a processor and a communications unit configured to communicate with distributed system application components such as API components to monitor the application health of the system components and to determine the source of an error for subsequent resolution. The computing device (e.g. the diagnostics server 108) is configured to utilize instructions (stored in a non-transient storage device), which when executed by the processor configured the computing device to perform operations such as operations 300.

At 302, operations of the computing device (e.g. diagnostics server 108) track communication between the system components (e.g. components 104) in a distributed system and monitor for an alert indicating an error in the communication in the distributed computer system. In one aspect, monitoring for the alert includes applying monitoring rules to the communication to proactively detect errors in the distributed system by monitoring for the communication between the components matching a specific error pattern. In one aspect, the computing device may further be configured to obtain the monitoring rules which include data integrity information for each of the types of communications between the system components. The monitoring rules may be used to verify whether the health logs comply with the data integrity information (e.g. to determine whether the data being communicated or otherwise transacted is consistent and accurate over the lifecycle of a particular task).

In one aspect, the health monitoring rules may further be defined based on historical error patterns for the communications in the distributed computer system. That is, a pattern set of pre-defined communication traffic flows for messages between the system components which may occur in each of the health logs may be mapped to particular error types. Thus, when a defined communication traffic flow is detected, it may be mapped to a particular error pattern thereby allowing further characterization of the error by error type including possible resolution.

Operations 304-308 of the computing device are triggered in response to detecting the presence of the error. At 304, upon detecting the error, operations of the computing device trigger receiving a health log from each of the system components (e.g. 104A-104N, collectively 104) together defining an aggregate health log. The health logs may be in a standardized format (e.g. JSON format) and utilize common key identifiers (e.g. connection identifier, digital identifier of a transaction, etc.). This allows consistency in the information communicated and tracking of the messages such that it can be used to determine a context of the messages and mapped to capture the key identifiers across the distributed components. In one aspect, the common key identifiers are used by the computing device for tracing a route of the messages communicated between the distributed system components and particularly, for a transaction having the error. Additionally, in one aspect, the health logs may follow a particular log pattern with one or more metadata (e.g. customer identification number, traceability identification number, timestamp, event information, etc.) which allows tracking and identification of messages communicated with the distributed system components. An example of the format of the health logs in shown in FIG. 5.

At 306 and further in response to detecting the error, operations of the computing device (e.g. diagnostics server 108) configure receiving from a data store of the computing device, network infrastructure information defining one or more relationship for connectivity and communication flow between the system components. The relationships characterize dependency information between the system components. The network infrastructure information may indicate for example, how the components are connected to one another and for a set of defined operations, how they are dependent upon and utilize resources of another component in order to perform the defined operation.

At 308, operations of the computing device automatically determine at least based on the aggregate health log and the network infrastructure information, a particular component of the system components originating the error and associated dependent components affected from the system components.

In a further aspect, automatically determining the origination of the error in a distributed component system includes comparing each of the health logs to the other health logs in response to the relationships in the network infrastructure information and may include mapping the information to predefined patterns for the logs to determine where the deviations from the expected communications may have occurred.

Figure 4:
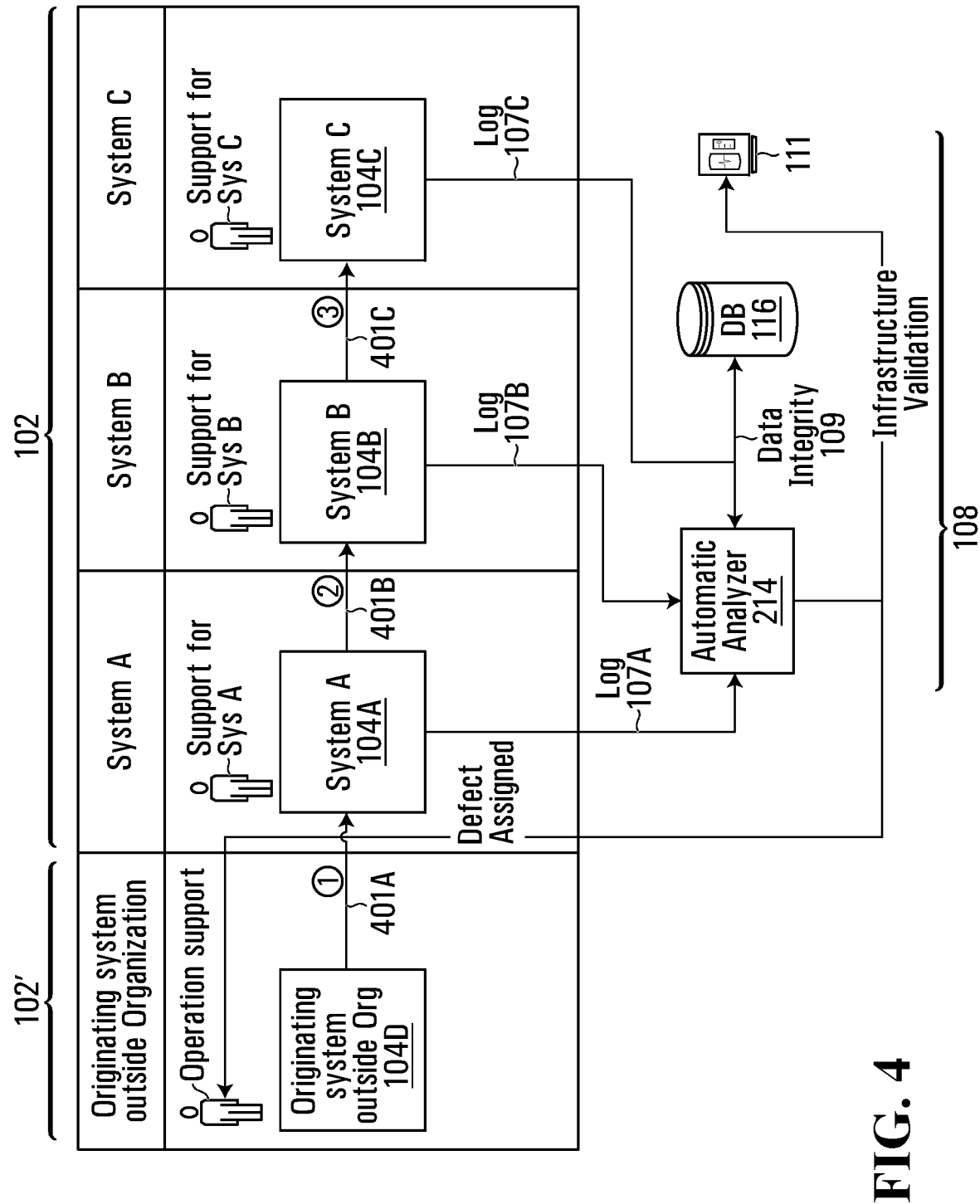
FIG. 4 is a schematic block diagram showing an example communication between the computing device comprising a plurality of interconnected system components A, B, and C and the diagnostic server components comprising the automatic analyzer and the data store in FIG. 1 in accordance with one or more aspects of the present disclosure.

Referring to FIG. 4, shown is an example scenario for flow of messages between distributed system components located both internal to an organization (e.g. on a private network) and remote to the organization (e.g. outside the private network). FIG. 4 further illustrates monitoring of health of the distributed components including error source origination detection for an error occurring in the message. As shown in FIG. 4, flow of messages may occur between internal system components 104A-104C located on a first computing device (e.g. computing device 102 of FIG. 1) and component 104D of an external computing device (e.g. a second computing device 102') located outside the institution provided by systems A-C. Other variations of distributions of the system components on computing devices may be envisaged. For example, each system component 104A-104D may reside on distinct computing devices altogether.

The path of a message is shown as travelling across link 401A to 401B to 401C.

Thus, as described above, the automatic analyzer module 214 initially receives a set of API logs (e.g. aggregate health logs 107A-107C characterizing message activity for system components 104A-104D, events and/or errors communicated across links 401A-401C) in a standardized format. The standardized format may be JSON and one or more key identifiers that link together the API logs as being related to a task or operation.

Figure 5:
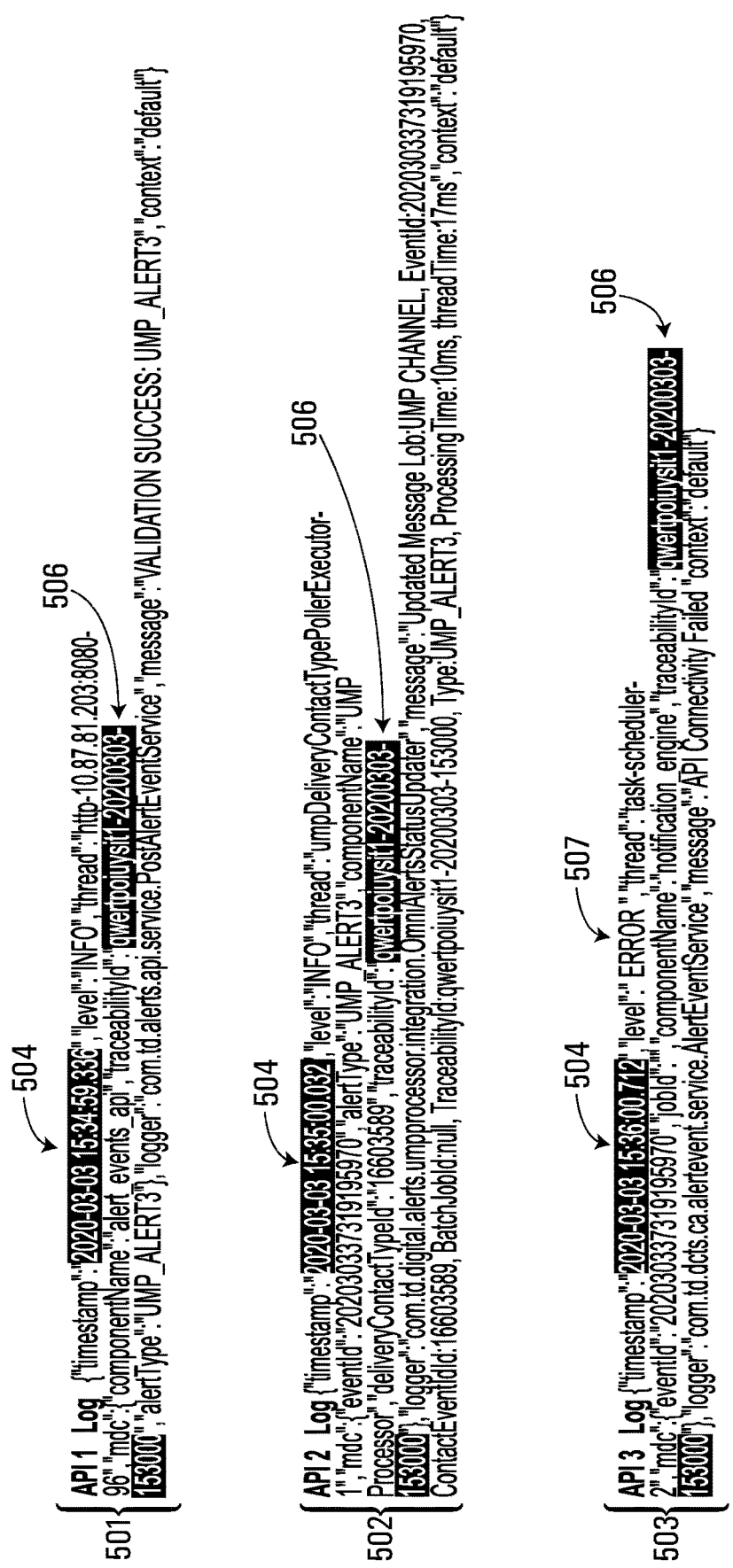
FIG. 5 is a diagram illustrating example health logs received from different system components and actions taken at the automatic analyzer in accordance with one or more aspects of the present disclosure.

FIG. 5 illustrates example API logs 501-503 (a type of health logs 107A-107C) which may be communicated between system components 104 such as system components 104A-104D of FIG. 4. For example, each API log from an API system component 104 would include API event information such as interactions with the API including calls or requests and its content. The API logs further include a timestamp 504 indicating a time of message and a traceability ID 506 which allows tracking a message path from one API to another (e.g. as shown in API logs 501-503).

For example, a message sent from a first API to a second API would have the same traceability ID (or at least a common portion in the traceability ID 506) with different timestamps 504. As noted above, when an error is detected in the overall system (e.g. error 507 in API log 503), the API logs 501-503 for all of the system components are reviewed at the automatic analyzer module 214. Additionally, the automatic analyzer module 214 receives network infrastructure info 111 metadata which defines relationships between the various API components 104 in the system including which component systems are dependent on others for each pre-defined type of action (e.g. message communication, performing a particular task, accessing a resource, etc.). Further, the automatic analyzer module 214 may retrieve from a data store 116, a set of health monitoring rules 109 which can define historical error patterns (e.g. an error of type X typically follows a path from API 1 to API 2) to recognize and diagnose errors. For example, the set of health monitoring rules 109 may map a traffic pattern between the API logs (e.g. API logs 501-503) to a particular type of error.

Thus, referring again to FIGS. 4 and 5, once an error is detected in the overall system (e.g. the error 507), the automatic analyzer module 214 utilizes the aggregate API logs 107A-107C (e.g. received from each of the system components having the same traceability ID), the network infrastructure information 111 and the monitoring rules 109 to determine which of the system components originated the error, characterizations of the error (e.g. based on historical error patterns) and associated dependent components directly affected by the error 507. The disclosed method and system allows diagnosis of health of application data communicated between APIs and locating the errors for subsequent analysis, in one or more aspects.

Subsequent to the above automatic determination of application health by the automatic analyzer module 214, including characterizing the error 507 (e.g. based on monitoring rules 109 characterizing prior error issues and types communicated between system components 104A-104D) along with which component(s) are responsible for the error 507 in the system (e.g. based on digesting the network infrastructure info 111) and associated components, the system may provide the diagnostic results as an alert to a user interface. The user interface may be associated with the automatic analyzer module 214 so that a user (e.g. system support) can see which API(s) are having issues and determine corrective measures. The user interface may display the results either on the diagnostics server 108 or any of the computing devices 102 for further action. This allows the network 100 shown in FIG. 1 to monitor its distributed components 104 and be proactive in providing error notification diagnostics for their systems support. The alert may be an email, a text message, a video message or any other types of visual displays as envisaged by a person skilled in the art. In one aspect, the alert may be displayed on a particular device based on the particular component originating the error as determined from the received health logs. In a further aspect, the alert is displayed on the user interface along with metadata characterizing the error including associated dependent components to the particular component originating the error.

Referring to FIGS. 4-6, an example of the automatic analyzer module 214 generating and sending such an alert 600 to a computing device (e.g. 102, 102' or 106, etc.) responsible for error resolution in the system component 104 which generated the error is shown in FIG. 6. In the case of FIG. 6, the automatic analyzer module 214 is configured to generate an email to the operations or support team (e.g. provided via a unified messaging platform and accessible via the computing devices in FIG. 1) detailing the error and reasoning for the error for subsequent resolution thereof.

Figure 7:
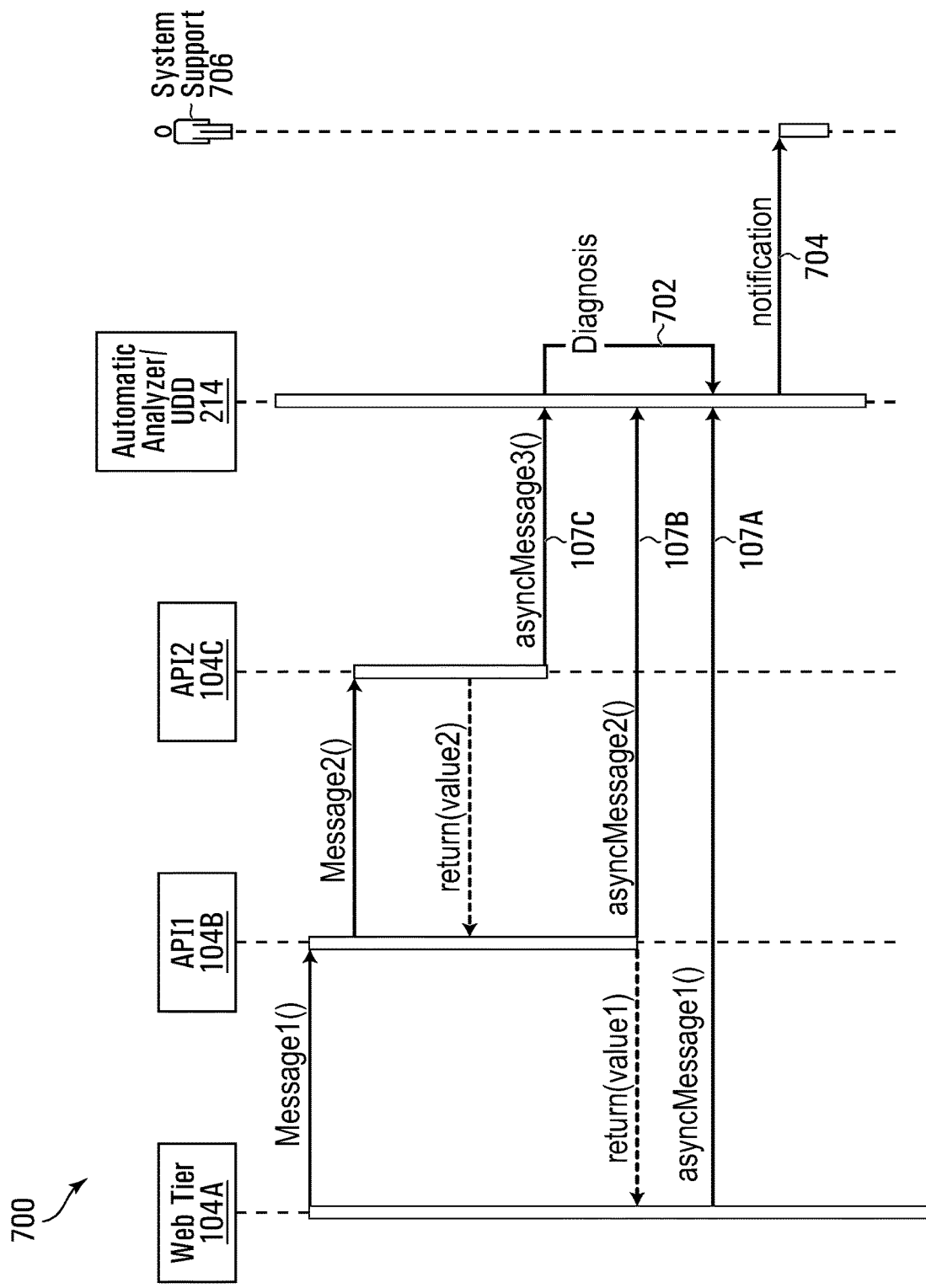
FIG. 7 is a diagram illustrating a typical flow of communication for the health monitoring performed by the automatic analyzer for providing deep diagnostic analytics in accordance with one or more aspects of the present disclosure.

Referring now to FIG. 7 shown is an example flow of messages 700, provided in at least one aspect, shown as Message(1)-Message(3) communicated in the network 100 of FIG. 1 between distributed system components 104A-104C (e.g. web tier(s) and API components) associated with distinct computing devices 102A, 102B, and 102C, collectively referred to as 102. The health of the distributed applications is monitored via health logs 107A-107C (e.g. asyncMessage(1)-asyncMessage(3)) and subsequently analyzed by the diagnostics server 108 via the automatic analyzer module 214 (e.g. also referred to as UDD—unified deep diagnostic analytics). As noted above, the health logs 107 may utilize a standardized JSON format defining a unified smart log pattern (USLP). The unified smart log pattern of the health logs 107 may enable a better understanding of the flow of messages; provide an indication of functional dependencies between the system components; and utilize a linking key metadata that connects messages via a common identifier (e.g. customer ID).

Additionally, as noted above, the automatic analyzer module 214 monitors the health logs and may apply a set of monitoring rules (e.g. monitoring rules 109 in FIG. 1) to detect errors including the origination source via pre-defined error patterns shown at step 702 and the expected operational resolution. In at least some aspects, the monitoring rules 109 applied by the analytics analyzer module 214 may include a decision tree or other machine learning trained model which utilizes prior error patterns to predict the error pattern in the current flow of messages 700. The results of the error analysis may be provided to a user interface at step 704, e.g. via another computing device 706 for further resolution. An example of the notification provided at step 704 to the other computer 706 responsible for providing system support and error resolution for the system component which originated the error is shown in FIG. 6. The notification provided at step 704 may be provided via e-mail, short message service (SMS), a graphical user interface (GUI), a dashboard (e.g. a type of GUI providing high level view of performance indicators), etc.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

One or more currently preferred embodiments have been described by way of example. It will be apparent to persons skilled in the art that a number of variations and modifications can be made without departing from the scope of the invention as defined in the claims.

What is claimed is:

1. A computing device for monitoring and analyzing health of a distributed computer system having a plurality of interconnected system components, the computing device having a processor coupled to a memory, the memory storing instructions which when executed by the processor configure the computing device to:
   track communication between the system components and monitor for an alert indicating an error or a recognized error pattern in the communication in the distributed computer system, upon detecting the error or the recognized error pattern:
   receive a health log from each of the system components together defining an aggregate health log, each health log being in a standardized format indicating messages communicated between the system components;
   capture, from each said health log within the aggregate health log, a common identifier, common to the system components communicating in a transaction, the common identifier linking a particular task to the messages communicated and depicting a route of the messages communicated between the system components for the particular task having the error or the recognized error pattern;
   receive, from a data store, network infrastructure information defining one or more relationships for connectivity and communication flow between the system components, the relationships characterizing dependency information between the system components;
   obtain a set of health monitoring rules comprising data integrity information for pre-defined communications between the system components from the data store, the set of health monitoring rules for verifying whether each said health log comprising the common identifier complies with the data integrity information, the set of health monitoring rules comprising defined historical error patterns derived from historical health logs, for the distributed computer system associating a set of traffic flows potentially occurring for the messages communicated between the system components as derived from respective common identifier in the historical health logs to a corresponding error type, thereby allowing the proactive spotting and diagnosing of the error or the recognized error pattern in the distributed computer system based on the historical error patterns; and
   automatically determine, based on applying the network infrastructure information to both the aggregate health log and the common identifier and further mapping to the set of health monitoring rules, a particular component of the system components originating the error or the recognized error pattern, associated dependent components from the system components affected, and the corresponding error type derived from applying the set of health monitoring rules.

2. The device of claim 1, further configured to:
   determine from the dependency information indicating which of the system components are dependent on one another for operations performed in the distributed computer system, an impact of the error or the recognized error pattern originated by the particular component on the associated dependent components.

3. The device of claim 2, further comprising upon detecting the alert:
   displaying the alert on a user interface of a client application for the device, the alert based on the particular component originating the error or the recognized error pattern determined from the aggregate health log.

4. The device of claim 3, further comprising: displaying on the user interface along with the alert, the associated dependent components to the particular component.

5. The device of claim 1, wherein the standardized format comprises a JSON format.

6. The device of claim 1, wherein the system components are APIs (application programming interfaces) on one or more connected computing devices and the health log is an API log for logging activity for the respective API in communication with other APIs and related to the error or the recognized error pattern.

7. The device of claim 1, wherein the processor configuring the computing device to automatically determine origination of the error or the recognized error pattern further comprises: comparing each of the health logs in the aggregate health log to the other health logs in response to the relationships in the network infrastructure information.

8. A method implemented by a computing device, the method for monitoring and analyzing health of a distributed computer system having a plurality of interconnected system components, the method comprising:
   tracking communication between the system components and monitor for an alert indicating an error or a recognized error pattern in the communication in the distributed computer system, upon detecting the error or the recognized error pattern:
   receiving a health log from each of the system components together defining an aggregate health log, each health log being in a standardized format indicating messages communicated between the system components;
   capturing, from each said health log within the aggregate health log, a common identifier, common to the system components communicating in a transaction, the common identifier linking a particular task to the messages communicated and depicting a route of the messages communicated between the system components for the particular task having the error or the recognized error pattern;

receiving, from a data store, network infrastructure information defining one or more relationships for connectivity and communication flow between the system components, the relationships characterizing dependency information between the system components;

obtaining a set of health monitoring rules comprising data integrity information for pre-defined communications between the system components from the data store, the set of health monitoring rules for verifying whether each said health log comprising the common identifier complies with the data integrity information, the set of health monitoring rules comprising defined historical error patterns derived from historical health logs, for the distributed computer system associating a set of traffic flows potentially occurring for the messages communicated between the system components as derived from respective common identifier in the historical health logs to a corresponding error type, thereby allowing the proactive spotting and diagnosing of the error or the recognized error pattern in the distributed computer system based on the historical error patterns; and automatically determining, based on applying the network infrastructure information to both the aggregate health log and the common identifier and further mapping to the set of health monitoring rules, a particular component of the system components originating the error or the recognized error pattern, associated dependent components from the system components affected, and the corresponding error type derived from applying the set of health monitoring rules.

9. The method of claim 8, further comprising:

determining from the dependency information indicating which of the system components are dependent on one another for operations performed in the distributed computer system, an impact of the error or the recognized error pattern originated by the particular component on the associated dependent components.

10. The method of claim 9, further comprising upon detecting the alert:

displaying the alert on a user interface of a client application for the device, the alert based on the particular component originating the error or recognized error pattern determined from the aggregate health log.

11. The method of claim 10, further comprising: displaying on the user interface along with the alert, the associated dependent components to the particular component.

12. The method of claim 8, wherein the standardized format comprises a JSON format.

13. The method of claim 8, wherein the system components are APIs (application programming interfaces) on one or more connected computing devices and the health log is an API log for logging activity for the respective API in communication with other APIs and related to the error or the recognized error pattern.

14. The method of claim 8, wherein automatically determining origination of the error or the recognized error pattern further comprises: comparing each of the health logs in the aggregate health log to the other health logs in response to the relationships in the network infrastructure information.

15. A computer readable medium comprising a non-transitory device storing instructions and data, which when executed by a processor of a computing device, the processor coupled to a memory, configure the computing device to:

track communication between system components of a distributed computer system having a plurality of interconnected system components and monitor for an alert indicating an error or a recognized error pattern in the communication in the distributed computer system, upon detecting the error or the recognized error pattern:

receive a health log from each of the system components together defining an aggregate health log, each health log being in a standardized format indicating messages communicated between the system components;

capture, from each said health log within the aggregate health log, a common identifier, common to the system components communicating in a transaction, the common identifier linking a particular task to the messages communicated and depicting a route of the messages communicated between the system components for the particular task having the error or the recognized error pattern;

receive, from a data store, network infrastructure information defining one or more relationships for connectivity and communication flow between the system components, the relationships characterizing dependency information between the system components;

obtain a set of health monitoring rules comprising data integrity information for pre-defined communications between the system components from the data store, the set of health monitoring rules for verifying whether each said health log comprising the common identifier complies with the data integrity information, the set of health monitoring rules comprising defined historical error patterns derived from historical health logs, for the distributed computer system associating a set of traffic flows potentially occurring for the messages communicated between the system components as derived from the common identifier in the historical health logs to a corresponding error type, thereby allowing the proactive spotting and diagnosing of the error or the recognized error pattern in the distributed computer system pattern based on the historical error patterns; and automatically determine, based on applying the network infrastructure information to both the aggregate health log and the common identifier and further mapping to the set of health monitoring rules, a particular component of the system components originating the error or the recognized error pattern, associated dependent components from the system components affected, and the corresponding error type derived from applying the set of health monitoring rules.

* * * * *